US007447182B2

(12) United States Patent
Chowdhury et al.

(10) Patent No.: US 7,447,182 B2
(45) Date of Patent: Nov. 4, 2008

(54) DISCOVERING AN ADDRESS OF A NAME SERVER

(75) Inventors: Kuntal Chowdhury, Plano, TX (US); Peter W. Wenzel, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1318 days.

(21) Appl. No.: 10/102,465

(22) Filed: Mar. 20, 2002

(65) Prior Publication Data

US 2002/0145993 A1 Oct. 10, 2002

Related U.S. Application Data

(60) Provisional application No. 60/296,973, filed on Jun. 8, 2001, provisional application No. 60/289,439, filed on May 8, 2001, provisional application No. 60/282,322, filed on Apr. 6, 2001.

(51) Int. Cl.
*H04Q 7/24* (2006.01)
(52) U.S. Cl. .......................... 370/338; 370/335; 370/352
(58) Field of Classification Search ................. 370/338, 370/352, 335
See application file for complete search history.

(56) References Cited

U.S. PATENT DOCUMENTS 6,785,823 B1 * 8/2004 Abrol et al. .................... 726/7

6,917,972 B1 * 7/2005 Basko et al. .................. 709/224
2002/0138649 A1 * 9/2002 Cartmell et al. .............. 709/245
2002/0191562 A1 * 12/2002 Kumaki et al. ............... 370/331
2005/0089008 A1 * 4/2005 Choo et al. .................. 370/349

FOREIGN PATENT DOCUMENTS

EP 1 017 208 A2 7/2000
WO WO 01/13602 A1 2/2001

OTHER PUBLICATIONS

J. Postel, Network Working Group, Request for Comments: 792, "Internet Control Message Protocol," pp. 1-20 (Sep. 1981).
S. Cobb, Network Working Group, Request for Comments: 1877 "PPP Internet Protocol Control Protocol Extensions for Name Server Addresses," pp. 1-6 (Dec. 1995).

(Continued)

*Primary Examiner*—Duc C Ho
(74) *Attorney, Agent, or Firm*—Trop, Pruner & Hu, P.C.

(57) ABSTRACT

A mobile communications network includes a packet service node capable of establishing a session with a mobile station. A network address (e.g., an Internet Protocol or IP address) of a domain name system (DNS) server is communicated to the mobile station using one of several types of messages. A first type of message includes an Internet Protocol Control Protocol (IPCP) message. A second type of message includes a Mobile Internet Protocol Registration Reply Message. The packet service node receives the network address of the DNS server from an authentication server, such as a RADIUS (Remote Authentication Dial In User System Service) server or a Mobile IP Authentication, Authorization, and Accounting (AAA) server.

23 Claims, 3 Drawing Sheets

OTHER PUBLICATIONS

C. McGregor, Network Working Group, Request for Comments: 1332 "The PPP Internet Protocol Control Protocol (IPCP)," pp. 1-13 (May 1992).

W. Simpson, Network Working Group, Request for Comments: 1661, "The Point-to-Point Protocol (PPP)," pp. 1-47 (Jul. 1994).

C. Rigney, et al., Network Working Group, Request for Comments: 2138, "Remote Authentication Dial in User Service (Radius)," pp. 1-57 (Apr. 1997).

C. Perkins, Network Working Group, Request for Comments: 3220, "IP Mobility Support for IPv4," pp. 1-86 (Jan. 2002).

S. Glass, et al., Network Working Group, Request for Comments: 2977, "Mobile IP Authentication, Authorization, and Accounting Requirements," pp. 1-24 (Oct. 2000).

T. Hiller, et al., Network Working Group, Request for Comments: 3141, "CDMA2000 Wireless Data Requirements for AAA," pp. 1-15 (Jun. 2001).

P. Mockapetris, Network Working Group, Request for Comments: 1034, "Domain Names—Concepts and Facilities," pp. 1-55 (Nov. 1987).

P. Mockapetris, Network Working Group, Request for Comments: 1035, "Domain Names—Implementation and Specification," pp. 1-55 (Nov. 1987).

David B. Johnson, et al., IETF Mobile IP Working Group Internet—Draft, "Mobility Support in IPv6," pp. 1-123 (Jul. 2001).

TIA/EIA/IS-835-1, TR 45, "CDMA2000 Wireless IP Network Standard—Addendum 1," pp. 1-60 (Apr. 2001).

R. Droms, *Automated Configuration of TCP/IP with DHCP*, IEEE Internet Computing, IEEE Service Center, Piscataway, NJ, vol. 3, No. 4, Jul. 1999, pp. 45-53.

* cited by examiner

DISCOVERING AN ADDRESS OF A NAME SERVER

CROSS REFERENCE TO RELATED APPLICATIONS

This claims the benefit under 35 U.S.C. § 119(e) of U.S. Provisional Applications Ser. Nos. 60/282,322, filed Apr. 6, 2001; 60/289,439, filed May 8, 2001; and 60/296,973, filed Jun. 8, 2001

TECHNICAL FIELD

The invention relates to discovering addresses of domain name system (DNS) servers in a mobile communications network.

BACKGROUND

A mobile communications network is typically made up of a plurality of cells. Each cell includes a radio base station, with each base station connected to a mobile switching center or a packet service node that manages communications sessions between mobile stations and terminals connected to a public switched telephone network (PSTN) or a packet-based data network. Communications between mobile stations and base stations are performed over wireless links.

Traditional wireless protocols define circuit-switched communications. Such protocols include time-division multiple access (TDMA) protocols or code-division multiple access (CDMA) protocols. In a circuit-switched network, a channel portion between two endpoints (e.g., two mobile stations) is occupied for the duration of the connection between the endpoints.

However, with the wide availability of the Internet and intranets, packet-switched communications (e.g., web browsing, electronic mail, and so forth) have become common. Generally, a circuit-switched connection is an inefficient technique for communicating packet data. As a result, third generation (3G) and beyond wireless technologies are being developed to provide higher bandwidth and more efficient packet-switched communications (of data as well as voice and other forms of real-time data) over wireless networks.

One example of a packet-switched wireless technology is the CDMA 2000 family of standards, also referred to as the IS-2000 Standards, which is developed by the Third Generation Partnership Project 2 (3GPP2). A CDMA 2000 wireless communications system is capable of supporting both circuit-switched services and packet-switched services. On the TDMA side, packet-switched wireless communications protocols have also been developed, including the Enhanced General Packet Radio Service (EGPRS) protocol as defined by the 3GPP (Third Generation Partnership Project) UMTS (Universal Mobile Telecommunications System) Release 1999 Standard.

In packet-switched communications, packets that are sent across a data network are routed based on a source network address and a destination network address contained in each packet. In one example, packets sent over a packet-based data network are defined by the Internet Protocol (IP). IP defines IP network addresses that are used by network terminals and routers to communicate packets among each other.

Often, a terminal or router on a network is aware of a static symbol (e.g., an alphanumeric name such as user1@nortelnetworks.com) associated with a destination terminal. To map this static symbol to a numerical IP address, a domain name system (DNS) server on the network is accessed. The DNS server includes a database that maps static symbols of various nodes on a network to their respective IP addresses.

As with every other node on a data network, for a mobile station in a mobile communications network to communicate with another entity on a data network using an alphanumeric name or other static symbol of the other entity, the mobile station needs to perform a DNS lookup to determine the IP address of the other entity. To access a DNS server, the mobile station needs to be aware of the IP address of the DNS server. However, existing packet-switched wireless protocols do not define an efficient mechanism for communicating the network address of a DNS server to a mobile station.

SUMMARY

In general, an improved method and apparatus is provided for communicating the network address of a domain name system (DNS) server to a mobile station in a mobile communications network. For example, a method for use in a mobile communications network comprises establishing a session between a mobile station and a packet service node in the mobile communications network. A network address of a domain name system (DNS) server is received at the mobile station from the packet service node.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
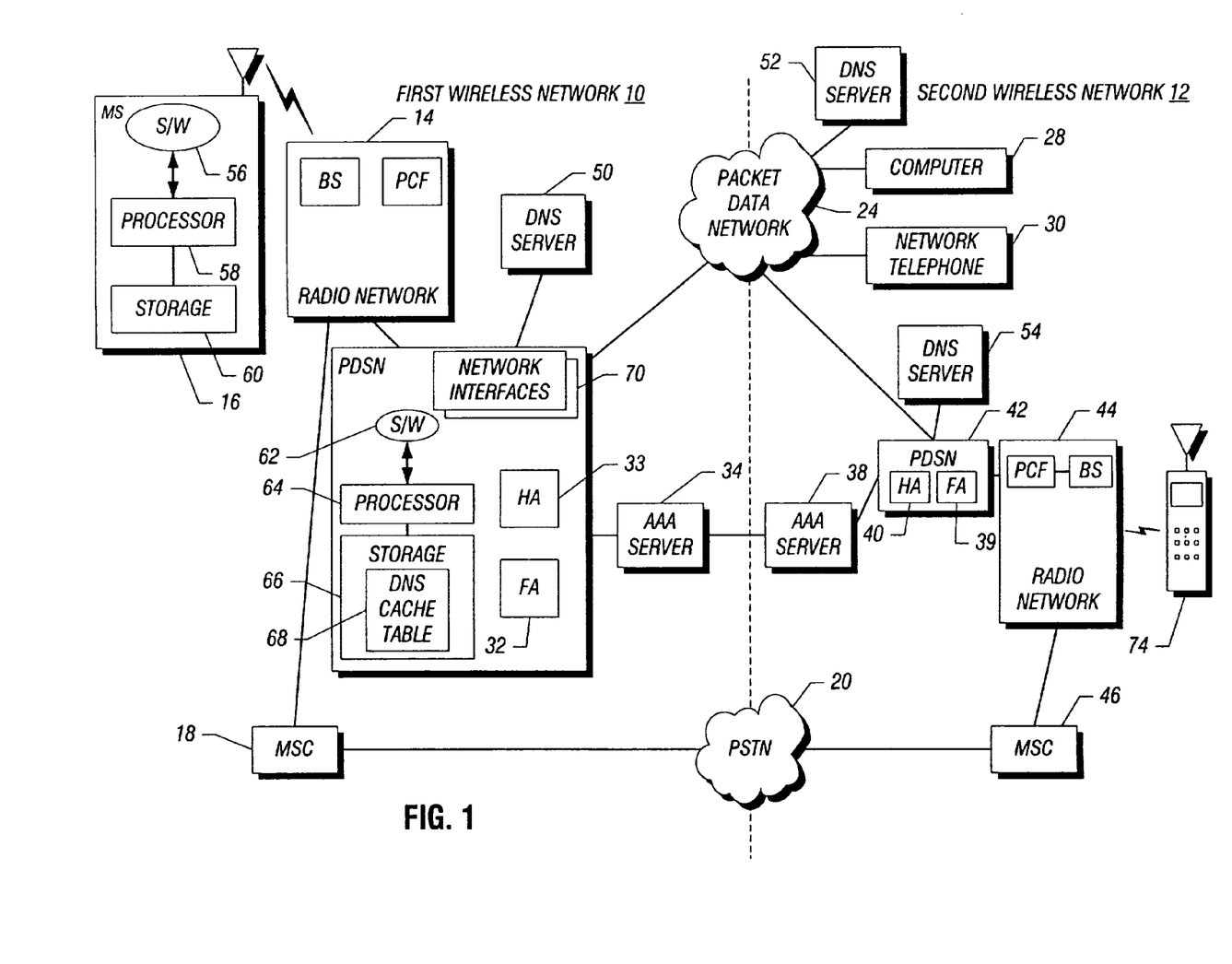
FIG. 1 is a block diagram of an example arrangement of a mobile communications network.

FIG. 1 illustrates an example arrangement of a mobile communications network that includes a first wireless network 10 (managed by a first service provider) and a second wireless network 12 (managed by a second service provider). The arrangement of FIG. 1 is an example of a mobile or wireless communications network that is implemented according to the code-division multiple access (CDMA) 2000 family of standards (also referred to as IS-2000), as developed by the Third Generation Partnership Project 2 (3GPP2). A CDMA 2000 wireless network is capable of supporting both circuit-switched services and packet-switched services. TIA/EIA/IS-835 is a standard that defines requirements for support of wireless packet data networking capability on a CDMA 2000 wireless system.

Other types of mobile communications networks can be employed in other embodiments, such as those networks based on time-division multiple access (TDMA) protocols.

One example of a TDMA protocol that supports packet-switched traffic is the Enhanced General Packet Radio Service (EGPRS) protocol, as defined by the 3GPP (Third Generation Partnership Project) UMTS (Universal Mobile Telecommunications System) Release 1999 Standard. The wireless protocols that support packet-switched services referred to here are provided as examples only, and are not to be considered limiting, as other types of protocols supporting packet-switched communications in a wireless network can be used in other embodiments.

A mobile station 16 in the first wireless network 10 is capable of communicating over a wireless link with a radio network 14, which includes base stations associated with respective cells or cell sectors in the first wireless network 10 Each base station (BS) in the radio network 14 has a transceiver to communicate radio frequency (RF) signals with mobile stations.

For communicating circuit-switched voice or other traffic, the radio network 14 is coupled to a mobile switching center (MSC) 18, which is responsible for switching mobile station-originated and mobile station-terminated circuit-switched traffic. Effectively, the MSC 18 is the interface for signaling end user traffic between the wireless network 10 and a public network, such as a public switched telephone network (PSTN) 20 or other MSCs. The PSTN 20 is connected to landline terminals (not shown).

The wireless network 10 is also capable of supporting packet-switched data services, in which packet data is communicated between the mobile station 16 and another endpoint, which can be a terminal coupled to a packet-based data network 24 or another mobile station that is capable of communicating packet data. Examples of the packet-based data network 24 include private networks (such as local area networks or wide area networks) and public networks (such as the Internet). Packet data is communicated in a packet-switched communications session established between the mobile station and the other endpoint.

To communicate packet data, the radio network 14 includes packet control function (PCF) modules that manage the relay of packets between base stations and a packet data serving node (PDSN) 26. The PCF modules and PDSN 26 are CDMA entities. In other types of mobile communications networks, other types of entities are involved in the routing of packet-switched data for mobile station-originated or mobile station-terminated sessions.

The PDSN 26 establishes, maintains, and terminates link layer sessions to mobile stations, and routes mobile station-originated or mobile station-terminated packet data traffic. The PDSN 26 is coupled to the packet-base data network 24, which is connected to various endpoints, such as a computer 28 or a network telephone 30. Examples of packet-switched communications include web browsing, electronic mail, text chat sessions, file transfers, interactive game sessions, voice-over-IP (Internet Protocol) sessions, and so forth. In one embodiment, packet-switched communications utilize a connectionless internetwork layer defined by IP. One version of IP is IPv4, described in RFC 791, entitled "Internet Protocol," dated September 1981; while another version of IP is IPv6, described in RFC 2460, entitled "Internet Protocol, Version 6 (IPv6) Specification," dated December 1998. In packet-switched communications, packets or other units of data carry routing information (in the form of network addresses) used to route the packets or data units over one or more paths to a destination endpoint.

It is common for endpoints involved in a packet-switched communications session to use a static symbol (such as an alphanumeric name) to identify a remote endpoint. One example of a static symbol is user1@nortelnetworks.com. Thus, for example, the mobile station 16 may wish to send packets to the computer 28 that is coupled to the packet data network 24. However, the mobile station 16 may know only the static symbol associated with the computer 28, not the IP network address of the computer 28. To enable the communication of packets from the mobile station 16 to the computer 28, the mobile station 16 must first perform a lookup of a domain name system (DNS) server. DNS is described in RFC 1034, entitled "Domain Names—Concepts and Facilities," dated November 1987; and in RFC 1035, entitled "Domain Names—Implementation and Specification," dated November 1987. The DNS server includes a database that associates static symbols with respective IP addresses. Thus, when a static symbol is provided to the DNS server, the DNS server looks up its database to find the corresponding IP address and returns the IP address to the node requesting the information. Although reference is made to specific standards relating to DNS, it is to be understood that some embodiments of the invention can be extended to cover other protocols relating to associating domain names or static symbols with network addresses. More generally, a DNS server is referred to as a "name server."

In the example arrangement of FIG. 1, three DNS servers 50, 52, and 54 are illustrated. The DNS server 50 is located locally in the first wireless network 10. Thus, for example, the DNS server 50 may be coupled by a LAN (local area network) to the PDSN 26. Similarly, the DNS server 54 is located locally in the second wireless network 12, and may be coupled by a LAN to a corresponding PDSN 42 in the second wireless network 12. Alternatively, another DNS server 52 may be located somewhere on the packet data network 24. Depending on service provider configuration, any one of the DNS servers 50, 52, and 54 may be identified as the DNS server for the mobile station 16 to use in performing DNS lookups.

For the mobile station 16 to access a given DNS server (one of DNS servers 50, 52, and 54, for example), the mobile station 16 must be aware of the network address of the DNS server. In accordance with some embodiments of the invention, a mechanism is provided to enable the PDSN 26 to communicate the network address of the assigned DNS server to the mobile station 16. This can be accomplished using one of several techniques, as described further below.

In some embodiments, another entity that is part of the first wireless network 10 is an Authentication, Authorization, and Accounting (AAA) server 34. The AAA server 34 is an entity that is defined to enable mobility of nodes between different wireless networks (such as between wireless network 10 and wireless network 12). The AAA server 34 provides authentication and authorization services for network nodes in the first wireless network 10. If the mobile station 16 is a visiting or roaming mobile station (for example, the mobile station 16 has a home in the second wireless network 12 but is visiting the first wireless network 10), the AAA server 34 interacts with an AAA server 38 in the second wireless network 12 to perform the authentication and authorization services. From the perspective of the visiting mobile station 16, the AAA server 34 is the foreign AAA server, while the AAA server 38 is the home AAA server. The designation of foreign and home is swapped for a mobile station 74 that is visiting the second wireless network (the home network of the mobile station 74 is the first wireless network 10). From the perspective of the mobile station 74, the AAA server 38 is the foreign AAA server, while the AAA server 34 is the home AAA server.

AAA is described in RFC 2977, entitled "Mobile IP Authentication, Authorization, and Accounting Requirements," dated October 2000. CDMA 2000 requirements for AAA are described in RFC 3141, entitled "CDMA 2000 Wireless Date Requirements for AAA," dated June 2001.

One protocol that enables a mobile station to change its point of attachment between a home network and a foreign network is the Mobile Internet Protocol, as described in RFC 3220, entitled "IP Mobility Support for IPv4," dated January 2002. Another version of mobile IP is described in Internet Engineering Task Force (IETF) Internet Draft, entitled "IP Mobility Support for IPv6, Draft-IETF-MobileIP-IPv6-15.txt," dated September 2001.

Although reference is made to Mobile IP in some described embodiments, other mobility protocols can be implemented in the first wireless network and the second wireless network 12 in other embodiments. Similarly, the presence of the AAA servers 34 and 38 is not a requirement. Other type of servers can be provided for performing authentication services outside the Mobile IP context. Thus, generally, each of the entities 34 and 38 can be referred to as an "authentication server." However, for purposes of this discussion, it is assumed that the entities 34 and 38 are AAA servers.

In one embodiment, each AAA server 34 implements messaging according to a Remote Authentication Dial In User Service (RADIUS) protocol, as described in RFC 2138, dated April 1997. RADIUS is a protocol that carries authentication, authorization, and configuration information. Thus, in one embodiment, the PDSN 26 acts as a RADIUS client that communicates authentication information with a local RADIUS server, which in the illustrated example is the AAA server 34. Similarly, the PDSN 42 in the second wireless network 12 is a RADIUS client that communicates information with the local AAA server 38. However, the use of RADIUS as a messaging protocol between each PDSN and its respective AAA server is provided as an example, as other embodiments can employ other types messaging to carry authentication information.

According to Mobile IP, "home agents" and "foreign agents" are also defined. When a mobile station first starts up in a foreign network, it sends a registration request to a foreign agent. For example, the mobile station 16 sends its registration request to the foreign agent (FA) 32 implemented as part of the PDSN 26. The foreign agent 32 is a router on the foreign network that provides routing services to the mobile station while the mobile station is registered. The foreign agent 32 detunnels and delivers packets to the mobile station that were tunneled by the home agent of the mobile station. In the example arrangement of FIG. 1, the home agent for mobile station 16 is home agent 40 implemented as part of the PDSN 42. Similarly, the mobile station 74 registers with a foreign agent in the second wireless network 12, in this case foreign agent 39 in the PDSN 32. The home agent for the mobile station 74 is the home agent 33 in the PDSN 26. However, in some cases, dynamic allocation of home agents can be performed in which the home agent is actually assigned in the visited or foreign network instead of the home network.

In the Mobile IP context, during the authentication phase, the foreign agent, foreign AAA server, home AAA server, and home agent exchange messages to perform authentication of the visiting mobile station. However, instead of Mobile IP operation, the visiting mobile station can also be involved in Simple IP operation, in which the concept of foreign agent and home agent do not apply. However, for Simple IP operation, authentication of the visiting mobile station still involves the foreign and home AAA servers in the foreign and home networks, respectively.

A Simple IP operation refers to a service in which a mobile station is assigned a dynamic IP address from a local PDSN and is provided IP routing service by a service provider network. The mobile station retains its IP address as long as it is served by a radio network that has connectivity to the address assigning PDSN. There is no IP address mobility beyond the PDSN. When the mobile station moves to another PDSN area in Simple IP operation, the mobile station will be assigned another IP address (resulting in a break in continuity). In the Mobile IP context, when the mobile station moves to a different PDSN area, the mobile station has the option of keeping the same IP address (to maintain continuity).

For Simple IP, the mobile station performs IP communication with another endpoint through the radio network and the PDSN. In contrast, in the Mobile IP context, IP communication between the mobile station and the endpoint occurs through the radio network, PDSN, and the home agent of the mobile station. The PDSN is the foreign agent, with a tunnel (protected by a security protocol such as IPsec, for example) established between the home agent and foreign agent.

Figure 2:
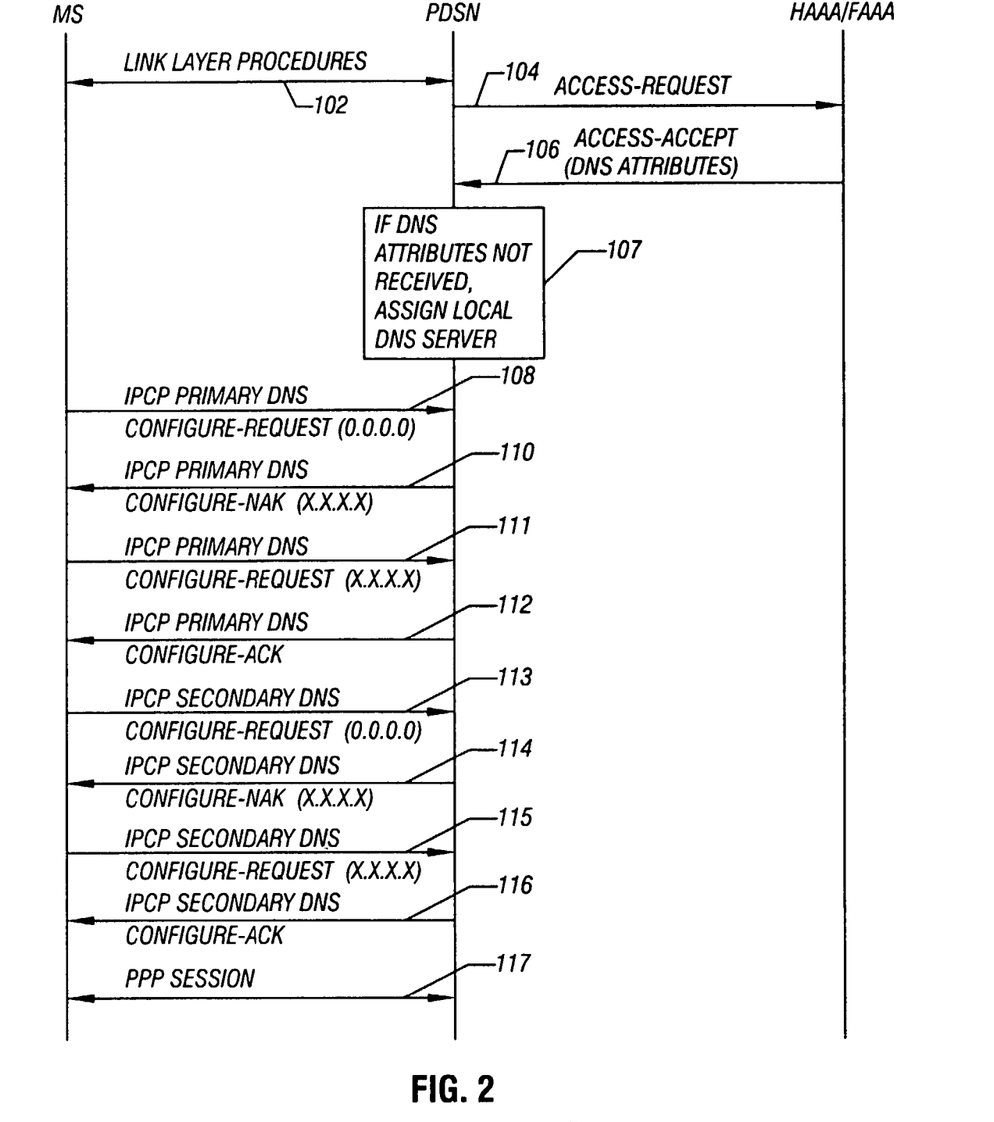
FIG. 2 is a message flow diagram of communicating a network address of a domain name system (DNS) server to a mobile station, in accordance with one embodiment.

As noted above, several mechanisms are provided in accordance with some embodiments of the invention to communicate the network address of the DNS server to a mobile station so that the mobile station can perform a DNS lookup. FIG. 2 shows one embodiment of this mechanism. The process described is from the viewpoint of the mobile station 16. However, the same process can be performed for other mobile stations as well.

The procedure shown in FIG. 2 for communicating IP addresses of DNS servers to a mobile station is in the Simple IP context. When the mobile station 16 first starts up in the wireless network 10, the mobile station 16 establishes a connection with the radio network 14 in a conventional manner. The radio network 14 then establishes an R-P session with the PDSN 26 for the mobile station 16. An R-P interface is provided between a PCF in the radio network 14 and the PDSN 26. An R-P session is a logical connection established over the R-P interface for a particular PPP (Point-to-Point Protocol) session. PPP provides a standard method for transporting multi-protocol packets over point-to-point links. Here, the PPP session is to be established between the mobile station 16 and the PDSN 26. PPP is described in RFC 1661, entitled "The Point-to-Point Protocol (PPP)," dated July 1994.

To establish a PPP session between the mobile station 16 and the PDSN 26, link layer procedures are performed (at 102). In the link layer procedures, the PDSN 26 sends a Link Control Protocol (LCP) Configure-Request message for a new PPP session to the mobile station. LCP, which is part of PPP, is used for establishing, configuring, and testing a datalink connection. If configuration options contained in the Configure-Request message are recognizable by the mobile station, the mobile station returns a Configure-Ack message.

For authentication purposes, the LCP Configure-Request message provides a configuration option to negotiate the authentication protocol used by the PDSN 26 in the authentication phase. To perform authentication, the PDSN 26 sends (at 104) a message to the foreign AAA server 34. In one embodiment, the message is an Access-Request message that is according to the RADIUS protocol. The PDSN 26 acts as a RADIUS client that communicates authentication information to the AAA server 34, which acts as the local RADIUS server. The Access-Request message contains the network address identifier (NAI) of the mobile station 16 and information used for authentication purposes.

The foreign AAA server 34 forwards the RADIUS Access Request message to the home AAA server 38. The home AAA server identifies the DNS server (and its network address) associated with the mobile station 16. The retrieved DNS server network address is added as a DNS attribute to a RADIUS Access-Accept message that is responsive to the Access-Request message.

In some cases, IP addresses of both a primary DNS server and a secondary DNS server are retrieved by the home AAA server 38 and added as corresponding attributes to the Access-Accept message. The primary DNS server attribute identifies the network address of the primary DNS server, which is used by the mobile station when available. However, if the primary DNS server becomes unavailable, then the mobile station performs a DNS lookup in the secondary DNS server, whose address is contained in the secondary DNS server attribute.

The home AAA server 38 sends the Access-Accept message (with DNS attributes) to the foreign AAA server 34, which forwards (at 106) the Access-Accept message to the PDSN 26. The Access-Accept message contains configuration information that is needed to begin delivery of service to the mobile station 16. In addition, in accordance with one embodiment of the invention, the Access-Accept message also contains the DNS attributes for the primary and secondary DNS servers. Effectively, in the Simple IP context, the DNS server network addresses are received by the PDSN 26 during the authentication phase of PPP session establishment.

The primary DNS server attribute and secondary DNS server attribute are contained in the Attributes field of the Access-Accept message. As defined by RADIUS, the Attributes field of the Access-Accept message is variable in length, and can contain a list of zero or more attributes.

In one example, the primary DNS server attribute has the following format:
Primary DNS Server Attribute:
Vendor-Type=54
Vendor-Length=6
Vendor-Value=IP Address (Primary DNS Server)

The secondary DNS server attribute has the following example format:
Secondary DNS Server Attribute:
Vendor-Type=55
Vendor-Length=6
Vendor-Value=IP Address (Secondary DNS Server)

In the example above, the primary DNS server attribute is identified by the Vendor-Type field having the value 54 (or some other predetermined value), and the secondary DNS server attribute is identified by the Vendor-Type field having the value 55 (or some other second predetermined value). Note, however, that the examples provided above are for purposes of illustration, and are not intended to limit the scope of the invention. In other embodiments, the primary and secondary DNS server attributes have other formats.

In some embodiments, a provision is also made for the case where the home AAA server 38 does not provide the primary and secondary DNS server network addresses. If that occurs, then the PDSN 26 accesses (at 107) a local table 68 (FIG. 1) in a storage 66 of the PDSN 26. For example, the local table 68 can be a cache that stores one or more network addresses of known DNS servers. The cache table 68 can also be stored in the local AAA server 34. Alternatively, instead of accessing the local table 68, the PDSN 26 can use another technique to find the DNS server network addresses, such as by accessing some other network server or node to find the information. The PDSN 26 can allocate the DNS server 50 or another DNS server (e.g., 52 or even 54) to the visiting mobile station 16. In other words, the PDSN 26 or local AAA server 34 can assign a DNS server in the foreign network, a DNS server in the home network, or a DNS server in another network for the visiting mobile station 16 if the home AAA server fails to communicate the DNS server address.

Once authenticated (by the Access-Accept message from the authentication server 34), the PDSN 26 performs IPCP (Internet Protocol Control Protocol) negotiations with the mobile station 16 to assign the mobile station 16 a dynamic IP address, negotiate PPP compression, and assign the primary and secondary DNS server network addresses to the mobile station 16. IPCP is part of the family of Network Control Protocols (NCPs), associated with PPP, for establishing and configuring various network-layer protocols between two endpoints. IPCP is described in RFC 1332, entitled "The PPP Internet Protocol Control Protocol (IPCP)," dated May 1992. Primary and secondary DNS server addresses are negotiated separately. Using IPCP messages for negotiating DNS server addresses is described in RFC 1877, entitled "PPP Internet Protocol Control Protocol Extensions for Name Server Addresses," dated December 1995. Thus, to perform the FIG. 2 procedure, each of the mobile station 16 and PDSN 26 is configured to perform IPCP negotiation for exchanging DNS server IP addresses.

As part of the IPCP negotiation to discover the DNS server IP addresses, the mobile station 16 sends (at 108) an IPCP Primary DNS Configure-Request message to the PDSN 26. The Configure-Request message sent by the mobile station 16 contains a primary DNS server address set to 0.0.0.0 or some other predefined value that is not a valid address. In response, the PDSN 26 sends (at 110) an IPCP Primary DNS Configure-Nak message back to the mobile station to indicate that certain values of the Configure-Request message are unacceptable. In this case, the 0.0.0.0 value of the primary DNS server address is not acceptable. The IPCP Primary DNS Configure-Nak message contains a valid primary DNS server address, which in the embodiment of FIG. 2 was either received from the AAA server 34 in the Access-Accept message sent at 106; retrieved from the cache table 68 by the PDSN 26; or derived by some other technique.

In response to receiving the valid primary DNS server address in the Configure-Nak message, the mobile station sends (at 111) another Primary DNS Configure-Request message to the PDSN 26, this time with the valid primary DNS server address. In response, the PDSN 26 returns (at 112) a Primary DNS Configure-Ack message to acknowledge receipt of a valid primary DNS server address.

The mobile station 16 also sends (at 113) an IPCP Secondary DNS Configure-Request message, which sets the secondary DNS server address to an invalid value, such as 0.0.0.0. In response, the PDSN 26 sends (at 114) an IPCP Secondary DNS Configure-Nak message, which contains the valid secondary DNS server address. Next, the mobile station 16 sends (at 115) another Secondary DNS Configure-Request message with the valid secondary DNS server address. The PDSN 26 sends (at 116) a Secondary DNS Configure-Ack acknowledgment message.

After further messages, a PPP session is established (at 117) between the mobile station and the PDSN 26. At this point, the mobile station 16 can start sending or receiving packets in sessions with other endpoints.

Alternatively, instead of using IPCP negotiation to communicate the DNS server network addresses, the PDSN 26 sends an Agent Advertisement message containing the DNS server network addresses to the mobile station. The Agent Advertisement message is basically an ICMP (Internet Control Message Protocol) neighbor router discovery message. A DNS server address extension can be added to the ICMP message. ICMP is described in RFC 792, entitled "Internet Control Message Protocol," dated September 1981.

Once the PPP session is established, the mobile station can send a DNS query to look up the network address of a network element the mobile station wishes to communicate with. The DNS query contains an alphanumeric name of the network element. The DNS query is carried in an IP packet with a destination address of the DNS server, which was discovered using the procedures discussed above. The PDSN 26 routes the packet to the DNS server based on the destination address.

In other embodiments, the use of the RADIUS Access-Request message to communicate DNS server addresses is not required. As a result, defining DNS attributes for the Access-Request message is not needed. In these other embodiments, the PDSN 26 uses another mechanism to identify network addresses of DNS servers for the visiting mobile station 16.

Communicating DNS server addresses to a visiting mobile station can also be performed in Mobile IP context, in which the visiting mobile station is able to traverse across different wireless networks, such as between the wireless network 12 and the wireless network 10, without disruption of service.

Figure 3:
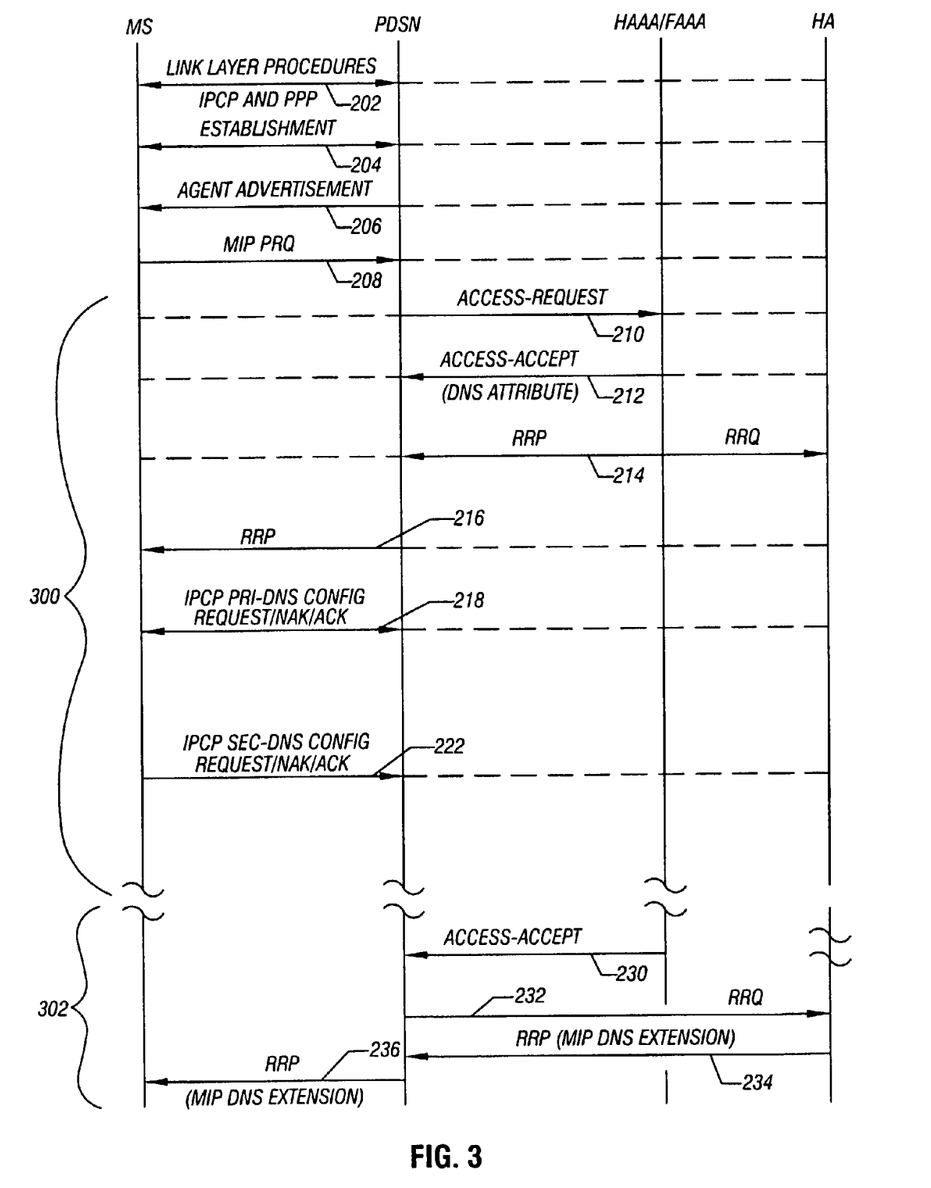
FIG. 3 is a message flow diagram of communicating the network address of the DNS server to a mobile station, in accordance with other embodiments.

Communicating the DNS server network addresses to the mobile station 16 in a Mobile IP context is shown in FIG. 3. It is assumed that the mobile station 16 is associated with home network 10 but is currently in the foreign network 12. As with the process of FIG. 2, the mobile station and PDSN performs link layer procedures (at 202) to start the establishment of a PPP session. Next, IPCP messages are exchanged to negotiate compression and other items for the PPP session.

Following establishment of the PPP session, the PDSN 26 sends (at 204) one or more Agent Advertisement messages (at 206) to the mobile station 16. The Agent Advertisement message is part of the Mobile IP registration process. The Agent Advertisement messages are transmitted by the PDSN 26 to advertise its services. Mobile stations use the advertisements to determine the current point of attachment to a data network.

The Agent Advertisement messages sent by the PDSN 26 to the mobile station 16 are stopped once the mobile station sends (at 208) a Mobile IP Registration Request (RRQ) message to the PDSN. A mobile station 16 registers with its home agent using a Registration Request message so that its home agent can create or modify a mobility binding for the mobile station. The request is relayed to the home agent 40 by the foreign agent 32 in the PDSN 26.

The PDSN 26 then sends an Access-Request message (at 210) to the foreign AAA server 34. Although not shown, the foreign AAA server 34 performs an exchange of messages with the home AAA server 38 in the home network of the mobile station 16 to authenticate the mobile station 16. Exchange of messages includes the Access-Request message that is forwarded by the foreign AAA server 34 to the home AAA server 38. In response, the home AAA server 38 sends back an Access-Accept message to the foreign AAA server 34, which then sends (at 212) the Access-Accept message to the PDSN 26. The Access-Accept message contains the DNS attributes, which in some embodiments include the primary DNS server attribute and the secondary DNS server attribute. Effectively, in the Mobile IP context, the PDSN 26 receives the DNS server network addresses during the Mobile IP registration phase.

Next, the foreign agent 32 in the PDSN 26 exchanges (at 214) Registration Request (RRQ) and Registration Reply (RRP) messages with the home agent 40. The Registration Reply message is then sent (at 216) by the PDSN 26 to the mobile station 16. The Registration Reply message contains necessary codes to inform the mobile station 16 of the status of its request, along with the lifetime granted by the home agent 40.

Following receipt of the Registration Reply message at 216, the mobile station 16 initiates IPCP reconfiguration (at 218), in which several messages are exchanged between the mobile station 16 and PDSN 26 to determine the network address of the primary DNS server. The mobile station 16 sends an IPCP Primary DNS Configure-Request message with the DNS address attribute set to an invalid value (e.g., 0.0.0.0). In response, the PDSN 26 sends an IPCP Primary DNS Configure-Nak message to the mobile station 16, with the message containing a valid primary DNS server address. The mobile station 16 then sends another Primary DNS Configure-Request message to the PDSN 26 with the valid primary DNS server address, followed by a return Primary DNS Configure-Ack message from the PDSN 26. The messages at 218 are similar to the messages at 108-112 in FIG. 2. Similarly, IPCP reconfiguration is performed (at 222) to determine the secondary DNS server address. The exchange of messages here is similar to the messages at 113-116 in FIG. 2. Alternatively, instead of using IPCP messages, an ICMP Agent Advertisement message can be used to communicate DNS server addresses from the PDSN 26 to the mobile station 16.

The messages exchanged at 212, 214, 216, 218, and 222 are part of a first type of procedure 300 for communicating DNS server addresses to a mobile station in the Mobile IP context. As explained above, the first type of procedure 300 involves IPCP renegotiation to communicate DNS server addresses to the mobile station.

According to an alternative embodiment, a second type of procedure 302 is performed. In the procedure 302, the foreign AAA server 34 sends (at 230) an Access-Accept message to the PDSN 26. This Access-Accept message is a conventional message that does not contain DNS attributes. Following receipt of the Access-Accept message, the foreign agent 32 in the PDSN 26 sends the Registration Request message (at 232) to the home agent 40. In this alternative embodiment, the home agent 40 returns a Registration Reply (RRP) message (at 234) to the foreign agent 32 in the PDSN 26. The Registration Reply message contains extensions for DNS information.

As defined by the Mobile IP protocol, the Registration Reply message contains an Extensions portion. In addition to extensions defined by RFC 3220, DNS extensions are also included in the Registration Reply message in accordance with the procedure 302. The DNS extensions contain the primary and secondary DNS server addresses.

The primary and secondary DNS server addresses are communicated in the DNS extensions of the Registration Reply message sent (at 236) to the mobile station 16.

Figure 4:
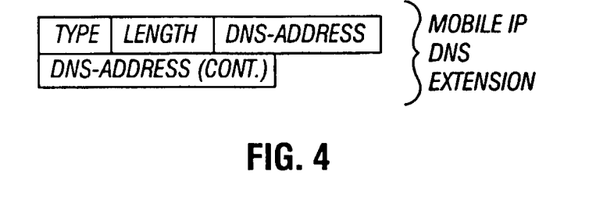
FIG. 4 illustrates an extension for a control message to carry a network address of a DNS server.

As shown in FIG. 4, according to one example, the format of the DNS extension for storing primary and secondary DNS server addresses is shown. The Type field indicates whether the Mobile IP DNS extension is for a primary DNS server IP address or a secondary DNS server IP address. The Length field indicates the length of the DNS IP address. The DNS IP Address field contains the IP address of the primary or secondary DNS server.

In accordance with the procedure 302 of FIG. 3, IPCP messages are not needed for negotiating the primary and secondary DNS server addresses. The procedure 302 has the advantage in that a smaller number of messages are exchanged between the PDSN and the mobile station 16 for communicating IP addresses of DNS servers to the mobile station. Also, since IPCP negotiation has already occurred (at 208), IPCP re-negotiation need not be performed in the procedure 302.

The acts performed by the various entities in communicating DNS server addresses to visiting mobile stations are controlled by software loaded in the respective entities. As shown in FIG. 1, the mobile station 16 includes software 56, and the PDSN 26 includes software 62. Instructions of the software are loaded for execution on corresponding control units or processors in each entity (processor 58 in mobile station 16 and processor 64 in the PDSN 26). The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. For example, the mobile station 16 includes storage 60 and the PDSN 26 includes storage 66. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A computer-readable storage medium containing instructions that when executed by a computer cause a system in a mobile communications network to:
   receive, from a mobile station, a first request to establish a packet data session;
   send a second request to an authentication server for the mobile station;
   receive a network address of a domain name system (DNS) server from the authentication server; and
   communicate the network address of the DNS server to the mobile station.

2. The computer-readable storage medium of claim 1, wherein the instructions when executed cause the system to exchange Internet Protocol Control Protocol (IPCP) messages with the mobile station to communicate the network Address of the DNS server.

3. The computer-readable storage medium of claim 1, wherein the instructions when executed cause the system to send a Mobile Internet Protocol Registration Reply message containing the network address of the DNS server to the mobile station.

4. The computer-readable storage medium of claim 1, wherein the instructions when executed cause the system to receive the network address of the DNS server from a Remote Authentication Dial Iii User Service (RADIUS) server.

5. The computer-readable storage medium of claim 1, wherein the instructions when executed cause the system to receive the network address of the DNS server from a Mobile Internet Protocol Authentication, Authorization, and Accounting (AAA) server.

6. The computer-readable storage medium of claim 1, wherein the instructions when executed cause the system to:
   receive the network address of the DNS server that is a primary DNS server;
   further receive a network address of a secondary DNS server from the authentication server; and
   further send the network address of the secondary DNS server to the mobile station.

7. The computer-readable storage medium of claim 1, wherein the instructions when executed cause the system to perform a local determination of the network address of the DNS server if receiving the network address from the authentication server is unsuccessful.

8. The computer-readable storage medium of claim 1, wherein the instructions when executed cause the system to:
   receive, at the system from the mobile station, a request to look up a network address of a network element based on an alphanumeric name of the network element; and
   forward the request to the DNS server.

9. The computer-readable medium of claim 1 Wherein the system is a packet data serving node (PDSN).

10. The computer-readable medium of claim 1 wherein receiving the network address comprises receiving the network address of the DNS server in a message responsive to the second request.

11. A system for use in a mobile communications network, comprising:
   an interface layer to establish a packet data session with a mobile station; and
   a processor adapted to receive a network address of a domain name system (DNS) server from one of an authentication server and a home agent, and to send the network address of the DNS server to the mobile station.

12. The system of claim 11, wherein the processor is adapted to generate an Internet Protocol Control Protocol (IPCP) message containing the network address to send to the mobile station.

13. The system of claim 11, wherein the processor is adapted to send the network address of the DNS server in a Mobile Internet Protocol Registration Reply message.

14. The system of claim 11, wherein the processor is adapted to receive the network address of the DNS server from an Authentication, Authorization, and Accounting (AAA) server.

15. The system of claim 11, wherein the processor is adapted to receive the network address of the DNS server during an authentication phase of a Point-to-Point Protocol (PPP) session establishment.

16. The system of claim 11, wherein the processor is adapted to receive the network address of the DNS server during a Mobile Internet Protocol registration phase.

17. The system of claim 11, wherein the system is a packet data serving node (PDSN).

18. The system of claim 11 wherein the processor is adapted to receive the network address of the DNS server in a message that is responsive to a request sent by the processor to the one of the authentication server and home agent.

19. A method performed by a system in a mobile communications network, comprising:
   establishing a packet data session with a mobile station;
   receiving a network address of a domain name system (DNS) server from one of an authentication server and a home agent: and
   sending the network address of the DNS server to the mobile station.

20. The method of claim 19, wherein sending the network address of the DNS server comprises sending the network address in an Internet Protocol Control Protocol (IPCP) message.

21. The method of claim 19, wherein sending the network address of the DNS server comprises sending the network address in an Mobile Internet Protocol Registration Reply message.

22. The method of claim 19, wherein the method is performed by the system that is a packet data serving node (PDSN).

23. The method of claim 19, wherein receiving the network address of the DNS server comprises receiving the network address of the DNS server in a message that is responsive to a request sent to the one of the authentication server and home agent.

* * * * *